United States Patent
Kawakami (10) Patent No.: US 9,967,414 B2
(45) Date of Patent: May 8, 2018

(54) MANAGEMENT SYSTEM AND MANAGEMENT METHOD

(71) Applicant: KYOCERA DOCUMENT SOLUTIONS INC., Osaka (JP)

(72) Inventor: Satoshi Kawakami, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days. days.

(21) Appl. No.: 15/630,139

(22) Filed: Jun. 22, 2017

(65) Prior Publication Data
US 2017/0374209 A1 Dec. 28, 2017

(30) Foreign Application Priority Data
Jun. 24, 2016 (JP) .................. 2016-125135

(51) Int. Cl.
*G03G 15/00* (2006.01)
*H04N 1/00* (2006.01)
*H04N 1/23* (2006.01)

(52) U.S. Cl.
CPC ....... *H04N 1/00344* (2013.01); *G03G 15/553* (2013.01); *H04N 1/00832* (2013.01); *H04N 1/2346* (2013.01); *H04N 2201/0094* (2013.01)

(58) Field of Classification Search
CPC ............... G03G 15/553; G03G 15/556; H04N 1/00344; H04N 1/00832; H04N 1/2346; H04N 2201/0094
See application file for complete search history.

(56) References Cited

U.S. PATENT DOCUMENTS

| | | | | |
|---|---|---|---|---|
| 2008/0273882 A1* | 11/2008 | Yamaguchi | .......... | G03G 15/553 399/8 |
| 2014/0023382 A1* | 1/2014 | Kawana | ............... | G03G 15/556 399/8 |
| 2016/0062293 A1* | 3/2016 | Nakamura | ........... | G03G 15/553 399/8 |

FOREIGN PATENT DOCUMENTS

JP 2015-087530 A 5/2015

* cited by examiner

*Primary Examiner* — Hoang Ngo
(74) *Attorney, Agent, or Firm* — Li & Cai Intellectual Property (USA) Office (57) ABSTRACT

A management system includes: a management server; one or more image forming apparatuses that notify the management server of information on a remaining amount of toner; and one or more terminals, in which the management server makes a toner remaining amount history by combining the information on the remaining amount of toner with time and date information, detects, based on the toner remaining amount history, that toner replacement has been performed when an increase rate of the remaining amount of toner exceeds a threshold value, and determines, based on the contract value, whether the remaining amount of toner before the toner replacement is not more than the contract value when the toner replacement is detected, and notifies the one or more terminals of that the performed toner replacement corresponds to a contract violation when the remaining amount of toner before the toner replacement is more than the contract value.

8 Claims, 8 Drawing Sheets

| Apparatus name | Customer name | Toner color | Toner remaining amount level at time of replacement | Replacement date | |
|---|---|---|---|---|---|
| ABUX22498 | A company | Cyan | 12% | 2015/08/11 | ~e1 |
| APEX7118 | B company | Magenta | 0% | 2015/08/12 | ~e2 |
| QVQIY628 | C company | Yellow | 5% | 2015/08/15 | ~e3 |
| ⋮ | ⋮ | ⋮ | ⋮ | ⋮ | |

FIG.4

| Apparatus name | Customer name | Toner color | Replacement prediction date | |
|---|---|---|---|---|
| ABUX22498 | A company | Black | 2015/09/02 | ~e4 |
| QVQIY628 | C company | Cyan | 2015/09/10 | ~e5 |
| ⋮ | ⋮ | ⋮ | ⋮ | |

FIG.5

| Apparatus name | Customer name | | Black | Cyan | Magenta | Yellow | |
|---|---|---|---|---|---|---|---|
| A company | ABUX22498 | Present toner remaining amount | 70% | 75% | 75% | 65% | e6 |
| | | Average remaining amount at time of replacement | 10% | 10% | 10% | 20% | e7 |
| | | Average replacement period | 23 days | 40 days | 45 days | 41 days | e8 |
| | | Number of days after replacement | 3 days | 15 days | 15 days | 25 days | e9 |

MANAGEMENT SYSTEM AND MANAGEMENT METHOD

CROSS REFERENCE TO RELATED APPLICATION

This application claims the benefit of Japanese Priority Patent Application JP2016-125135 filed Jun. 24, 2016, the entire contents of which are incorporated herein by reference.

BACKGROUND OF THE INVENTION

1. Field of the Invention

The present disclosure relates to a management system and a management method that manage toner replacement of an image forming apparatus (MFP, Multifunction Peripheral).

2. Description of Related Art

Toners used in an image forming apparatus for printing are provided by a vendor or a dealer of the image forming apparatus.

SUMMARY OF THE INVENTION

It is desirable to provide a management system and a management method that appropriately manage toner replacement by a customer.

A management system according to an embodiment of the present disclosure includes
  a management server connected to a network;
  one or more image forming apparatuses connected to the network, each of the
  one or more image forming apparatuses being managed by the management server; and
  one or more terminals that access the management server, each of the one or more terminals being connected to the network, in which
    the management server includes
    a first memory that stores a contract value database, a contract value for each of the one or more image forming apparatuses being stored in the contract value database, the contract value being set in licensing contract regarding each of the one or more image forming apparatuses, the contract value being a remaining amount of toner when performing toner replacement,
    a second memory that stores a first information processing program,
    a first processor that executes the first information processing program, and
    a first communication device capable of communicating with the one or more image forming apparatuses and the one or more terminals,
  each of the one or more image forming apparatuses includes
    a third memory that stores a second information processing program,
    a second processor that executes the second information processing program, and
    a second communication device capable of communicating with the management server,
  when the second processor of each of the one or more image forming apparatuses executes the second information processing program, the second processor
    notifies the management server of information on the remaining amount of toner of the corresponding image forming apparatus via the second communication device, and
  when the first processor of the management server executes the first information processing program, the first processor
    acquires the information on the remaining amount of toner from each of the one or more image forming apparatuses via the first communication device,
    makes a toner remaining amount history by combining the information on the remaining amount of toner with time and date information, the toner remaining amount history being stored in the first memory as a toner remaining amount history database,
    detects, based on the toner remaining amount history, that the toner replacement has been performed when an increase rate of the remaining amount of toner exceeds a threshold value, and
    determines, based on the contract value in the contract value database, whether the remaining amount of toner before the toner replacement is not more than the contract value when the toner replacement is detected, and notifies the one or more terminals of that the performed toner replacement corresponds to a contract violation when the remaining amount of toner before the toner replacement is more than the contract value.

A management method for a management system according to an embodiment of the present disclosure includes a management server connected to a network, one or more image forming apparatuses connected to the network, each of the one or more image forming apparatuses being managed by the management server, and one or more terminals that access the management server, each of the one or more terminals being connected to the network, the management method including:
  storing, in a first memory of the management server, a contract value database, a contract value for each of the one or more image forming apparatuses being stored in the contract value database, the contract value being set in licensing contract regarding each of the one or more image forming apparatuses, the contract value being a remaining amount of toner when performing toner replacement;
  notifying, by each of the one or more image forming apparatuses, the management server of information on the remaining amount of toner of the corresponding image forming apparatus via the second communication device; and
  by the management server,
    acquiring, the information on the remaining amount of toner from each of the one or more image forming apparatuses via the first communication device;
    making a toner remaining amount history by combining the information on the remaining amount of toner with time and date information, the toner remaining amount history being stored in the first memory as a toner remaining amount history database;
    detecting, based on the toner remaining amount history, that toner replacement has been performed when an increase rate of the remaining amount of toner exceeds a threshold value; and
    determining, based on the contract value in the contract value database, whether the remaining amount of toner before the toner replacement is not more than the contract value when the toner replacement is detected, and notifies the one or more terminals of that the performed toner replacement corresponds to a contract violation when the remaining amount of toner before the toner replacement is more than the contract value.

These and other objects, features and advantages of the present disclosure will become more apparent in light of the following detailed description of best mode embodiments thereof, as illustrated in the accompanying drawings.

DETAILED DESCRIPTION OF THE PREFERRED EMBODIMENTS

Hereinafter, an embodiment of the present disclosure will be described with reference to the drawings.

[Configuration of Entire System]

Figure 1:
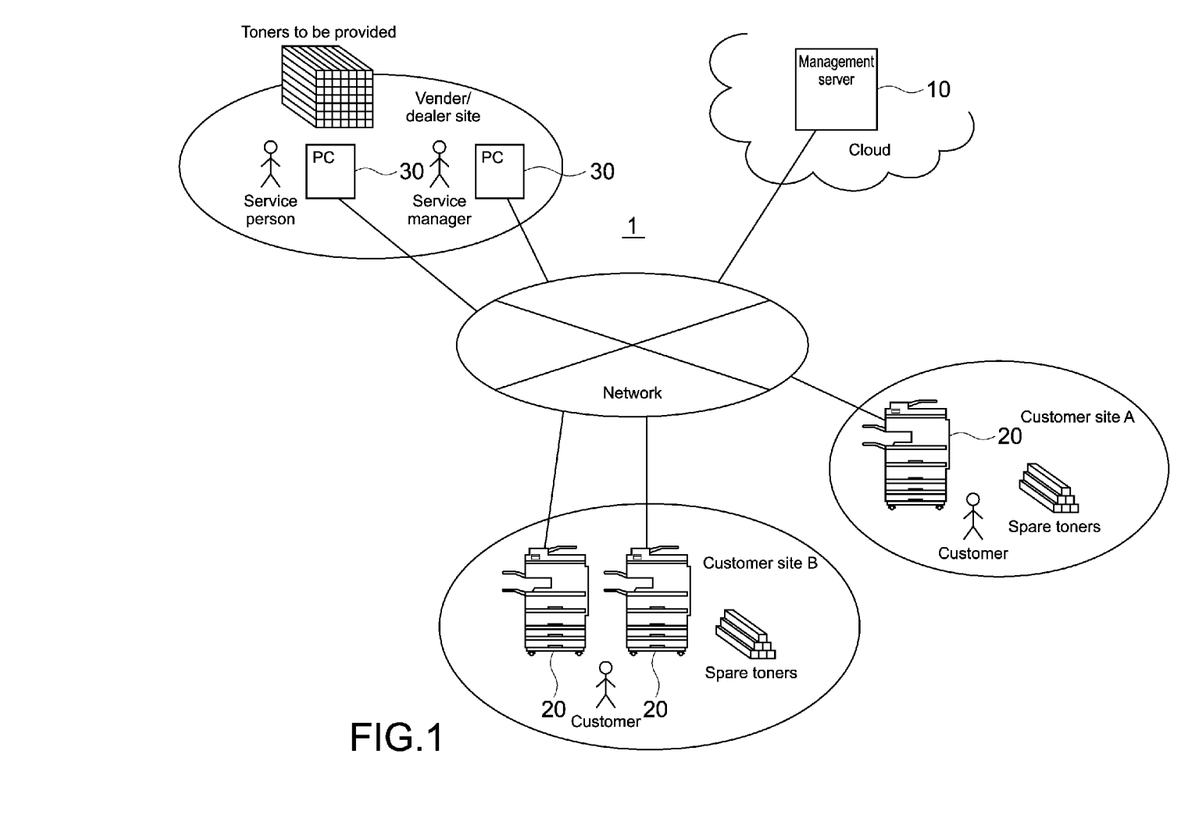
FIG. 1 shows a configuration of an entire management system 1 according to an embodiment of the present disclosure.

First, a configuration of an entire management system according to an embodiment of the present disclosure will be described. FIG. 1 shows a configuration of an entire management system 1 according to an embodiment of the present disclosure.

The management system 1 includes a management server 10, one or more image forming apparatuses 20, and one or more PCs (Personal Computers) 30 (terminals). Configurations of the management server 10 and the one or more image forming apparatuses 20 will be described later in detail. As each of the PCs 30, a general-purpose PC capable of accessing the management server 10 may be used. Therefore, description of the configuration thereof will be omitted.

The management server 10 is, for example, placed in the cloud and connected to, via a network, the one or more image forming apparatuses 20 to be managed by the management server 10 and the one or more PCs 30 that accesses the management server 10.

Each image forming apparatus 20 is placed at each customer site and used by the customer. At the customer site, spare toners are stocked in case that the image forming apparatus 20 runs out of toner.

When the remaining amount of toner of the image forming apparatus 20 is reduced, the customer replaces the toner (toner cartridge) of the image forming apparatus 20 with the spare toner (toner cartridge). Then, the customer requests a service person of a vender/dealer site to provide a toner in order to supplement the reduced spare toners.

When the service person receives the request for a toner, he/she provides an appropriate toner to the customer.

Note that a toner is provided by the service person not only when he/she receives a request from the customer but also when the management server 10 determines that the remaining amount of toner in the image forming apparatus 20 is reduced to be lower than a specific value.

A service manager and service persons at the vender/dealer site acquire necessary information by using the one or more PCs 30 that access the management server 10 in the cloud.

Each service person checks the remaining amount of toner of the one or more image forming apparatuses 20 of his/her customer, and provides toners, for example.

The service manager is a supervisor of the service persons and checks toner replacement of all the image forming apparatuses 20 handled by the service persons of his/her subordinates. In the case where there is a contract violation of toner replacement, the management server 10 notifies the service manager of the contract violation, and the service manager addresses the contract violation.

Note that assumption is made that all the customers make licensing contracts of the image forming apparatuses 20 with the vender/dealer, and it has been decided in the contracts that toner replacement is performed after the remaining amount of toner is reduced to less than a specific value (contract value, e.g., 5%).

The configuration of the entire management system according to an embodiment of the present disclosure has been described heretofore.

[Configuration of Management Server]

Figure 2:
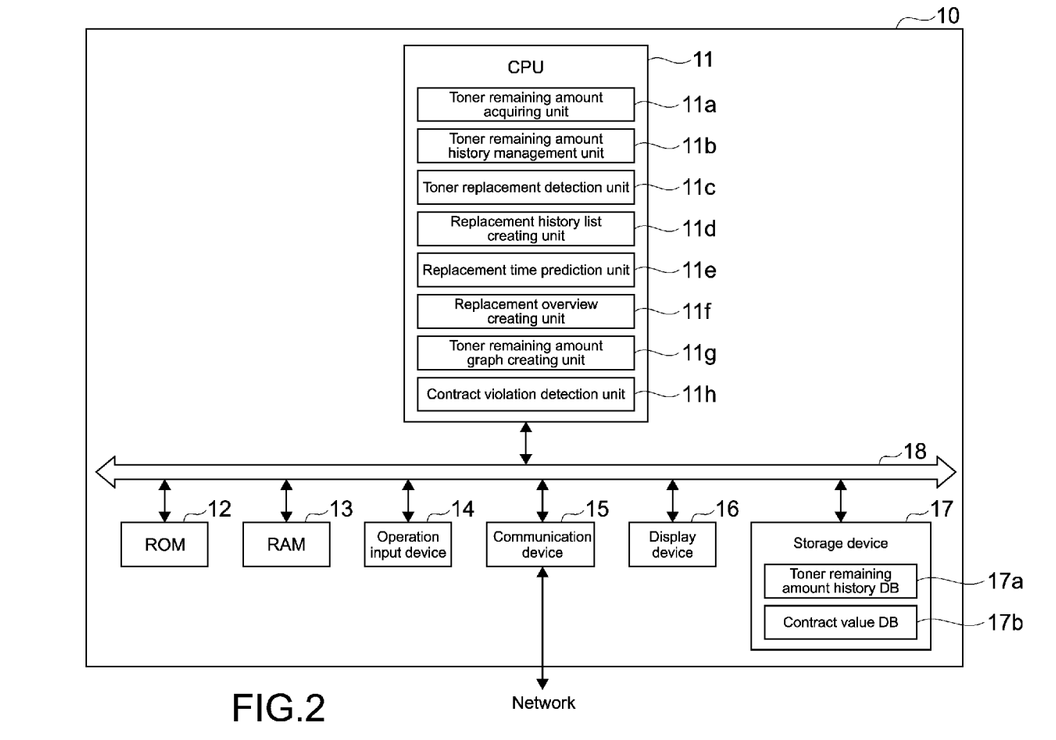
FIG. 2 shows a configuration diagram in the case where a management server 10 is a general-purpose computer.

Next, a configuration of the management server 10 will be described. The management server 10 may be constituted of dedicated hardware or software, or may be a general-purpose computer. FIG. 2 shows a configuration diagram in the case where the management server 10 is a general-purpose computer.

As shown in FIG. 2, the management server 10 includes a CPU (Central Processing Unit) 11, a ROM (Read Only Memory) 12, a RAM (Random Access Memory) 13, an operation input device 14, a communication device 15 (first communication device), a display device 16, and a storage device 17, and these blocks are connected to each other via a bus 18.

The ROM 12 fixedly stores a plurality of programs such as firmware for executing various types of processing, and data. The RAM 13 is used as a work area of the CPU 11 and temporarily stores an OS (Operating System), various applications being executed, and various types of data being processed.

The storage device 17 (first memory) is, for example, an HDD (Hard Disk Drive), a flash memory, or other nonvolatile memories. The storage device 17 stores a toner remaining amount history DB (database) 17a and a contract value DB 17b in addition to the OS, various applications, and various types of data.

The toner remaining amount history DB 17a is a database in which information on a remaining amount of toner collected from the one or more image forming apparatuses 20 managed by the management server 10 and time and date information are stored as a history in relation to each other.

The contract value DB 17b is a database that stores a contract value for each of the one or more image forming apparatuses 20 in the case where it has been decided in the licensing contract regarding the image forming apparatuses 20 between each customer and a vendor or a dealer that toner replacement is to be performed after the level of a remaining amount of toner falls below a specific value (contract value).

The communication device 15 is connected to a network for sending/receiving information to/from the image forming apparatuses 20 and the PCs 30.

Of the plurality of programs stored in the ROM 12 (second memory) or the storage device 17 (second memory), the CPU 11 (first processor) loads a program in the RAM 13 in response to a command input via the operation input device 14, and appropriately controls the display device 16 and the storage device 17 according to the loaded program.

The operation input device 14 is, for example, a pointing device such as a mouse, a keyboard, a touch panel, or other operation devices.

The display device 16 is, for example, a liquid crystal display, an EL (Electro-Luminescence) display, or a plasma display.

Next, functional blocks will be described. When the CPU 11 (first processor) of the management server 10 executes a program (first information processing program), the CPU 11 (first processor) operates as the functional blocks described below.

The functional blocks that the CPU 11 of the management server 10 realizes include a toner remaining amount acquiring unit 11*a* (toner remaining amount acquiring circuit), a toner remaining amount history management unit 11*b* (toner remaining amount history management circuit), a toner replacement detection unit 11*c* (toner replacement detection circuit), a replacement history list creating unit 11*d* (replacement history list creating circuit), a replacement time prediction unit 11*e* (replacement time prediction circuit), a replacement overview creating unit 11*f* (replacement overview creating circuit), a toner remaining amount graph creating unit 11*g* (toner remaining amount graph creating circuit), and a contract violation detection unit 11*h* (contract violation detection circuit).

The toner remaining amount acquiring unit 11*a* acquires information on a remaining amount of toner from the one or more image forming apparatuses 20 managed by the management server 10.

The toner remaining amount history management unit 11*b* stores the information on a remaining amount of toner collected by the toner remaining amount acquiring unit 11*a* in the toner remaining amount history DB 17*a* in relation to time and date information. Further, in the case where a toner remaining amount history is required, the toner remaining amount history management unit 11*b* reads the information on the remaining amount of toner from the toner remaining amount history DB 17*a* and provides the information on the remaining amount of toner as a toner remaining amount history.

The toner replacement detection unit 11*c* detects, based on a toner remaining amount history, that toner replacement has been performed when the increase rate of the remaining amount of toner exceeds a specific threshold value.

The replacement history list creating unit 11*d* creates, based on detection of the toner replacement by the toner replacement detection unit 11*c*, a list of times and dates when toner replacement is performed (a replacement history list) for each customer and for each of the one or more image forming apparatuses 20, and provides the created list to the one or more PCs 30.

The replacement time prediction unit 11*e* predicts, based on the toner remaining amount history, when the image forming apparatuses 20 run out of toner next time, and creates a replacement time prediction list. Note that a generally-used known technology is used as the prediction method. The replacement time prediction list is provided to the PCs 30.

The replacement overview creating unit 11*f* creates, based on the toner remaining amount history, an overview regarding toner replacement (replacement overview) for each customer and for each of the one or more image forming apparatuses 20, and provides the created overview to the one or more PCs 30.

The toner remaining amount graph creating unit 11*g* creates, based on the toner remaining amount history, a toner remaining amount graph to make transition of the remaining amount of toner easy to understand, and provides the created toner remaining amount graph to the one or more PCs 30.

The contract violation detection unit 11*h* detects toner replacement that corresponds to a contract violation and notifies a service manager and a service person of that the contract violation detection unit 11*h* has detected toner replacement that corresponds to a contract violation by sending information on the detection to the one or more PCs 30.

The configuration of the management server 10 has been described heretofore.

[Configuration of Image Forming Apparatus]

Figure 3:
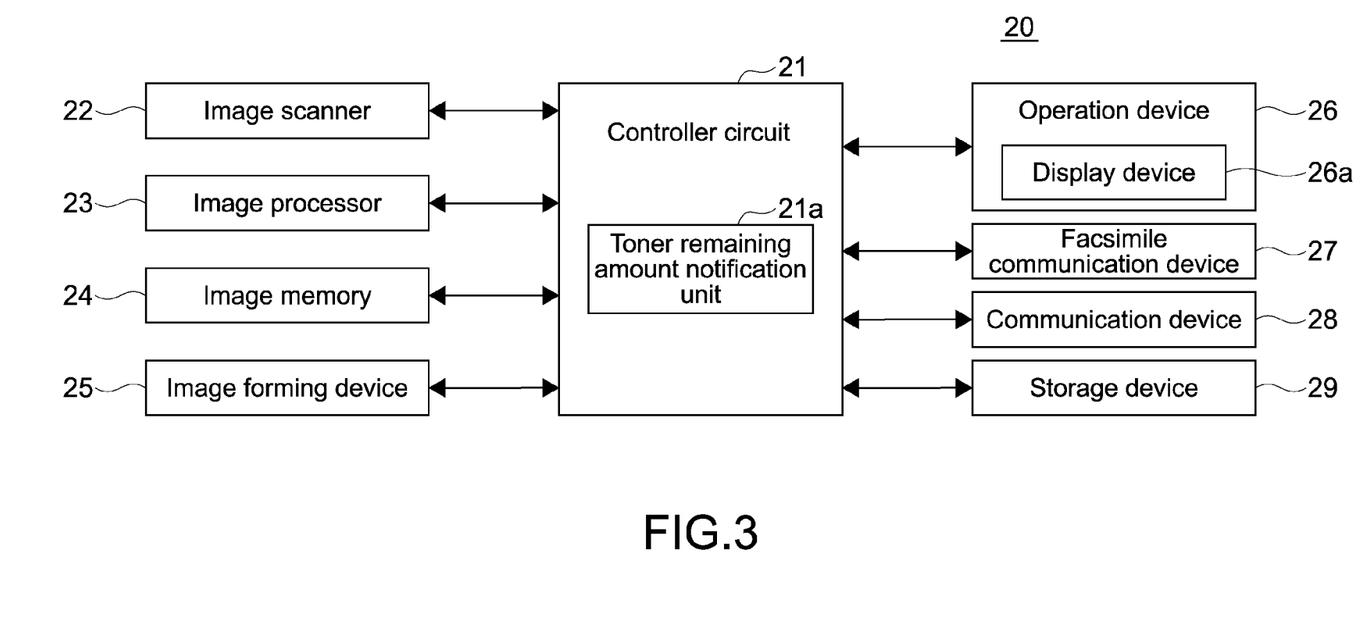
FIG. 3 schematically shows a configuration of an image forming apparatus 20.

Next, a configuration of each image forming apparatus 20 will be described. FIG. 3 schematically shows a configuration of the image forming apparatus 20.

Each image forming apparatus 20 includes a controller circuit 21. The controller circuit 21 includes a CPU, a RAM, a ROM, dedicated hardware circuits, and the like and performs overall operational control of the image forming apparatus 20.

The controller circuit 21 is connected to an image scanner 22, an image processor 23, an image memory 24, an image forming device 25, an operation device 26, a display device 26*a*, a facsimile communication device 27, a communication device 28 (second communication device), a storage device 29, and the like. The controller circuit 21 performs operational control of the respective devices connected thereto and sends/receives signals and data to/from those devices.

According to job execution instructions input by a user via the operation device 26 or a personal computer connected to a network, the controller circuit 21 controls drive and processing of mechanisms requisite for executing operational control of functions such as a scanner function, a printing function, a copy function, and a facsimile sending/receiving function.

Further, the controller circuit 21 includes a toner remaining amount notification unit 21*a* (toner remaining amount notification circuit). The CPU (second processor) of each of the one or more image forming apparatuses 20 loads a program, which is stored in a ROM or the like (third memory), in a RAM and executes the program (second information processing program). When the CPU (second processor) of each of the one or more image forming apparatuses 20 executes the program (second information processing program), the CPU (second processor) operates as the toner remaining amount notification unit 21*a*, which is a functional block.

The toner remaining amount notification unit 21*a* notifies the management server 10 of information on a remaining amount of toner of the corresponding image forming apparatus 20. The notification may be periodically performed or performed as a response to an inquiry from the management server 10.

The image scanner 22 reads an image from a script.

The image processor 23 carries out image processing as necessary on image data of an image read by the image scanner 22. For example, the image processor 23 corrects shading of an image read by the image scanner 22 and carries out other image processing to improve the quality of the image to be formed.

The image memory 24 includes an area that temporarily stores data of a script image read by the image scanner 22 or data to be printed by the image forming device 25.

The image forming device 25 forms an image of image data and the like read by the image scanner 22.

The operation device 26 includes a touch panel device and an operation key device that accept user's instructions on various operations and processing executable by the one or more image forming apparatuses 20. The touch panel device includes the display device 26a such as an LCD (Liquid Crystal Display) equipped with a touch panel.

The facsimile communication device 27 includes an encoding/decoding device, a modulation/demodulation device, and an NCU (Network Control Unit) (all of which are not shown) and transmits facsimiles using a public telephone network.

The communication device 28 is constituted of a communication module such as a LAN board and sends/receives various types of data to/from apparatuses such as the management server 10 and the one or more PCs 30 in a local area via a LAN connected to the communication device 28, and the like.

The storage device 29 stores a script image read by the image scanner 22, and the like. The storage device 29 is a large-volume storage device such as an HDD (Hard Disk Drive).

The configuration of each image forming apparatus 20 has been described heretofore.

[Example of Replacement History List]

Figure 4:
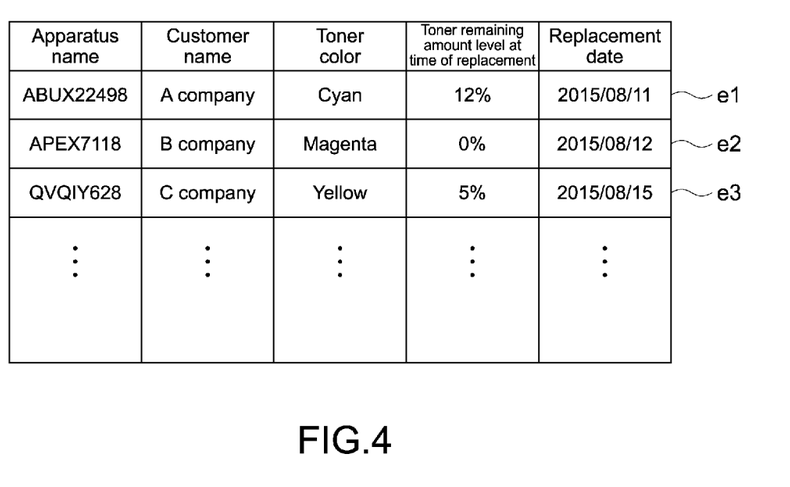
FIG. 4 shows an example of a replacement history list.

Next, an example of a replacement history list that is created by the replacement history list creating unit 11d and provided to the PC 30 will be described. FIG. 4 shows an example of the replacement history list.

For example, an entry e1 of FIG. 4 represents that a cyan toner is replaced in an image forming apparatus ABUX22498 of A company on Aug. 11, 2015, and the remaining amount of toner before the toner replacement is 12%.

It can be seen that if the contract value in the image forming apparatus ABUX22498 is 5%, this toner replacement corresponds to a contract violation.

Further, for example, an entry e2 of FIG. 4 represents that a magenta toner is replaced in an image forming apparatus APEX7118 of B company on Aug. 12, 2015, and the remaining amount of toner before the toner replacement is 0%.

It can be seen that this toner replacement does not violate the contract because the remaining amount of toner before the toner replacement is 0%.

Note that similarly, it can be seen that the toner replacement represented by an entry e3 does not correspond to a contract violation in the case where the contract value is 5%.

As described above, the service manager and the service persons can easily know, by referring to the replacement history list, whether or not toner replacement is performed at appropriate timing.

An example of the replacement history list that is created by the replacement history list creating unit 11d and provided to the PC 30 has been described heretofore.

[Example of Replacement Time Prediction List]

Figure 5:
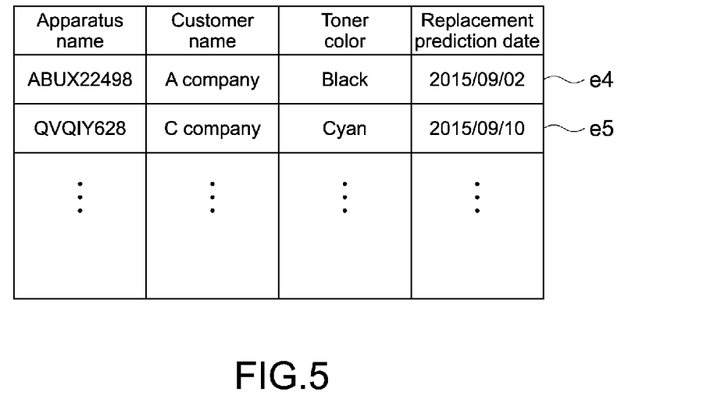
FIG. 5 shows an example of a replacement time prediction list.

Next, an example of a replacement time prediction list that is created by the replacement time prediction unit 11e and provided to the PC 30 will be described. FIG. 5 shows an example of a replacement time prediction list.

For example, in an entry e4 of FIG. 5, it is predicted that the image forming apparatus ABUX22498 of A company runs out of black toner on Sep. 2, 2015.

Since the customer will replace the black toner around Sep. 2th accordingly, the service person can provide a toner for supplement at appropriate timing.

An example of the replacement time prediction list that is created by the replacement time prediction unit 11e and provided to the PC 30 has been described heretofore.

[Example of Overview]

Figure 6:
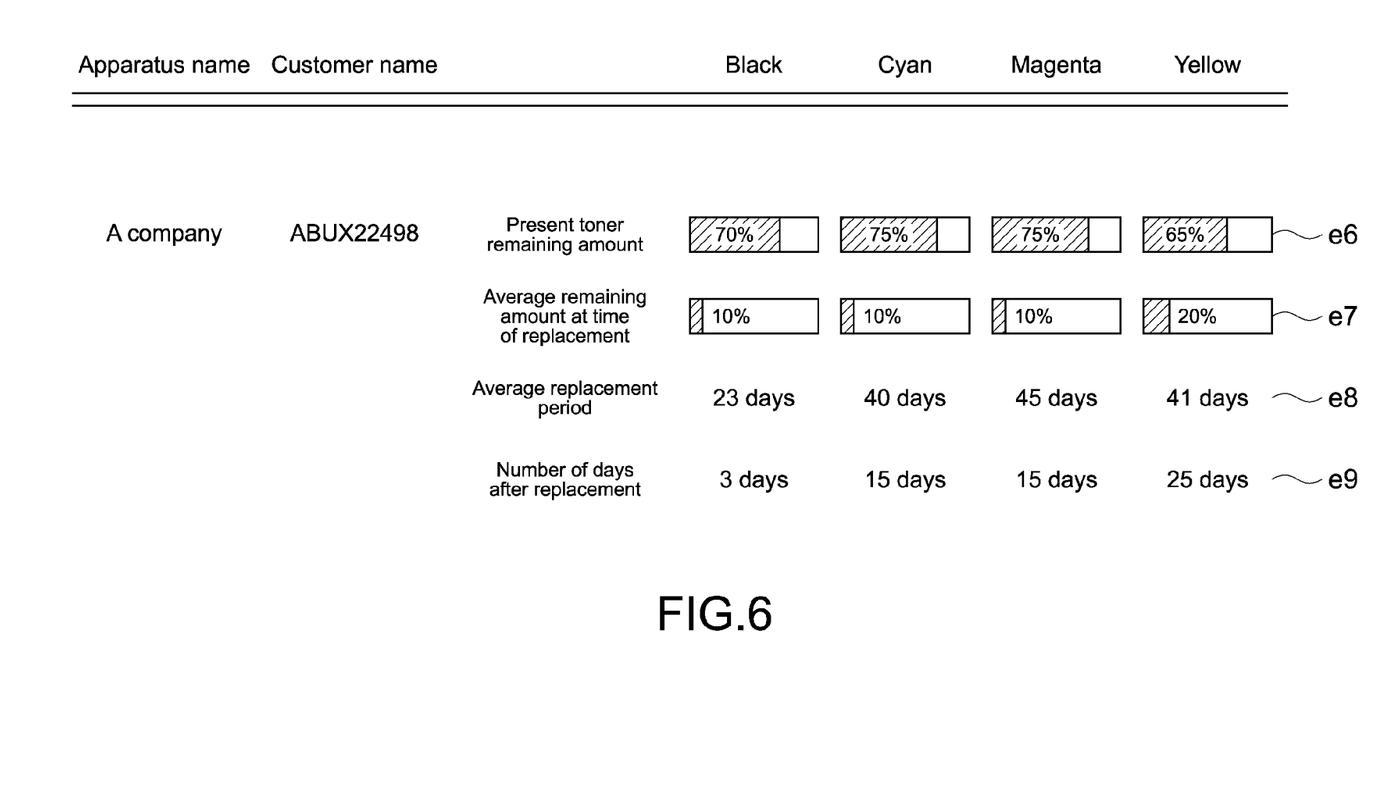
FIG. 6 shows an example of a replacement overview.

Next, an example of a replacement overview that is created by the replacement overview creating unit 11f and provided to the PC 30 will be described. FIG. 6 shows an example of the replacement overview.

In the example shown in FIG. 6, various kinds of information related to toner replacement are shown for each color of toner, for each customer and for each image forming apparatus.

As the various kinds of information, for example, the present remaining amount of toner is shown as percentage for each color (see e6), the average remaining amount at the time of toner replacement is shown as percentage for each color (see e7), the average replacement period is shown as the number of days for each color (see e8), and the number of days from when toner replacement is previously performed is shown (see e9).

The service manager and the service person can predict, by referring to the replacement overview, the time and date when the next toner replacement is to be performed.

An example of the replacement overview that is created by the replacement overview creating unit 11f and provided to the PC 30 has been described heretofore.

[Example of Toner Remaining Amount Graph]

Figure 7:
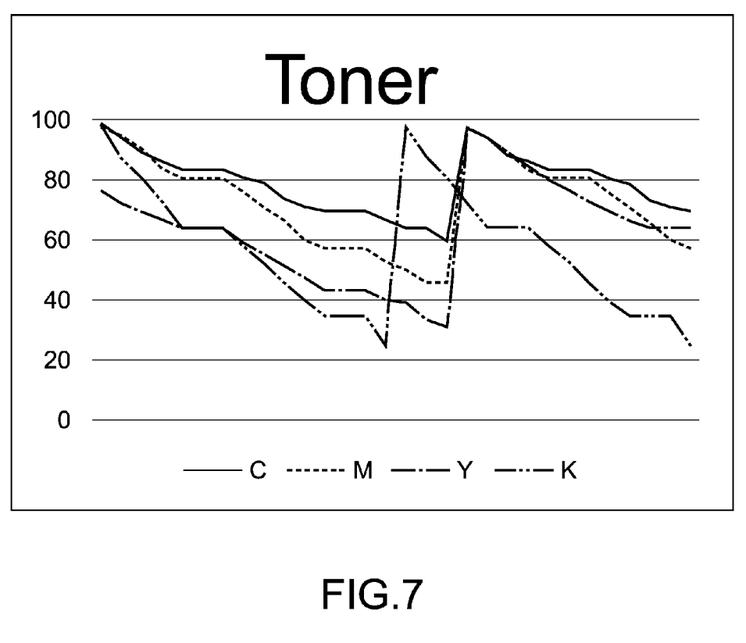
FIG. 7 shows an example of a toner remaining amount graph.

Next, an example of a toner remaining amount graph that is created by the toner remaining amount graph creating unit 11g and provided to the PC 30 will be described. FIG. 7 shows an example of the toner remaining amount graph.

In this example, it can be seen that a black toner is replaced with a new toner when the remaining amount of black toner reaches 25% and then, a yellow toner, a cyan toner, and a magenta toner are replaced with new toners when the remaining amount of yellow toner reaches 30%.

By graphically showing the remaining amount of toner in this way, a user can know the situation before and after the toner replacement at a glance.

An example of the toner remaining amount graph that is created by the toner remaining amount graph creating unit 11g and provided to the PC 30 has been described heretofore.

[Flow of Processing (Detection of Contract Violation)]

Figure 8:
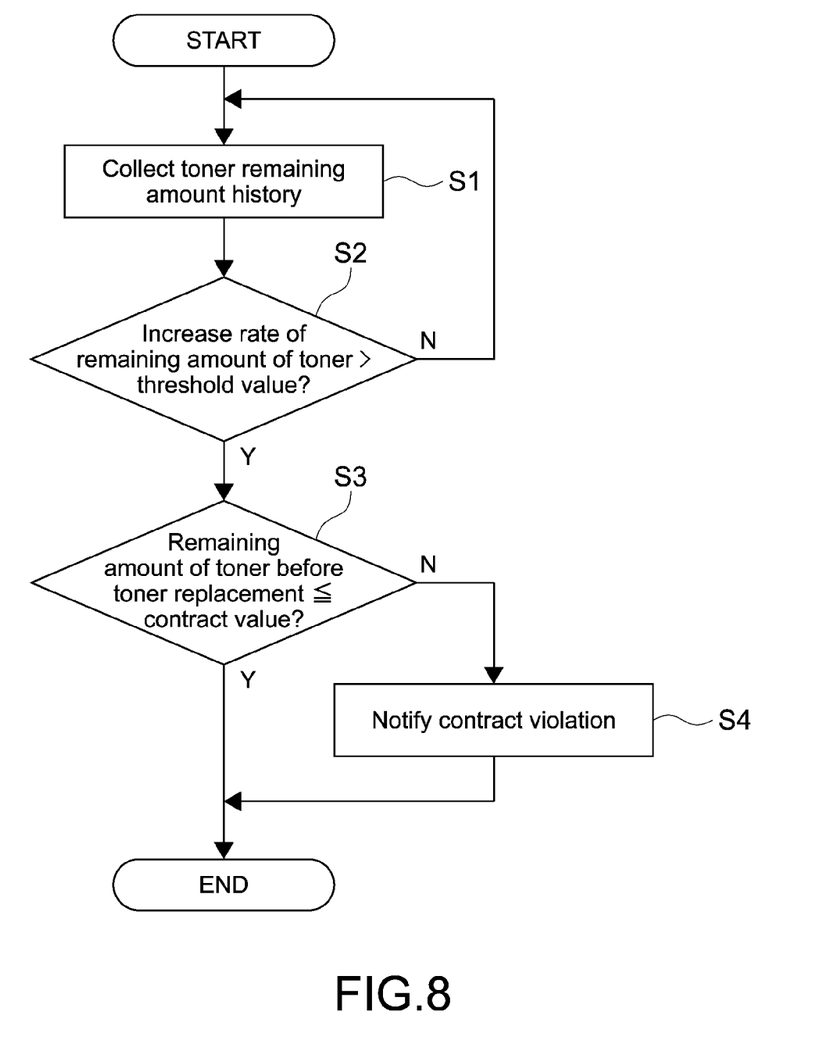
FIG. 8 shows a detection processing flow of toner replacement that corresponds to a contract violation in the management system 1.

Next, a flow of processing of detecting toner replacement in the management system 1 that corresponds to a contract violation will be described. FIG. 8 shows a detection processing flow of toner replacement that corresponds to a contract violation in the management system 1.

First, the toner remaining amount acquiring unit 11a collects information on a remaining amount of toner from each image forming apparatus 20, and the toner remaining amount history management unit 11b stores the information on a remaining amount of toner in the toner remaining amount history DB 17a as a history (Step S1).

Next, the toner replacement detection unit 11c determines, based on the toner remaining amount history, whether or not the increase rate of the remaining amount of toner exceeds a threshold value (Step S2).

In the case where the toner replacement detection unit 11c detects that the increase rate of the remaining amount of toner does not exceed the threshold value (N in Step S2) and regards the detection as toner replacement having not been performed, the processing returns to Step S1 and is continued.

In the case where the toner replacement detection unit 11c detects that the increase rate of a remaining amount of toner exceeds the threshold value (Y in Step S2) and regards the detection as toner replacement having been performed, the contract violation detection unit 11h determines, based on the contract value in the contract value DB 17b, whether the remaining amount of toner before the toner replacement is not more than the contract value (Step S3).

In the case where the remaining amount of toner before toner replacement is more than the contract value (N in Step S3), the contract violation detection unit 11h notifies the service manager or the service person of that the performed toner replacement corresponds to a contract violation by sending information on the contract violation to the PC 30 (Step S4).

The flow of processing of detecting toner replacement that corresponds to a contract violation in the management system 1 has been described heretofore.

[Disregard of Noise]

Next, disregard of noise will be described.

Figure 9:
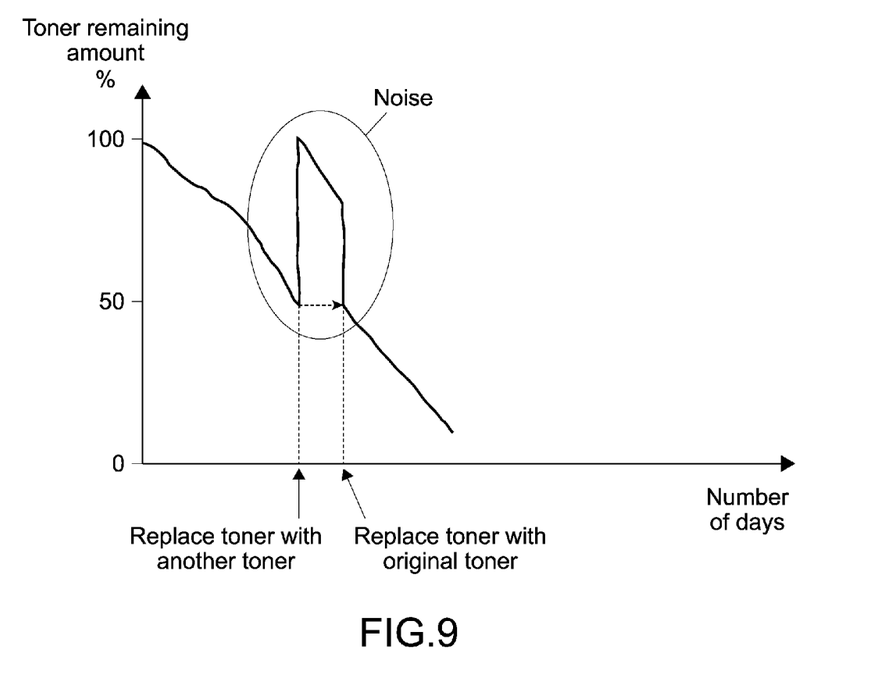
FIG. 9 shows transition of a remaining amount of toner when noise is generated.

In actual operation of the image forming apparatus 20, in the case where a customer assumes mass printing, a half-used toner is temporarily replaced with a new toner and the new toner is replaced with the original toner after the mass printing, in some cases. In such a situation, noise is generated in a graph of transition of the remaining amount of toner.

FIG. 9 shows transition of a remaining amount of toner when noise is generated.

In the case where such toner replacement and re-replacement are performed, a typical noise pattern appears on the graph.

In this case, when the noise pattern shown in FIG. 9 appears, the contract violation detection unit 11h detects a contract violation once because a remaining amount of toner before toner replacement at the time of toner replacement is 50%. However, in the case where the toner remaining amount acquiring unit 11a detects within a particular period (e.g., several days) that the acquired remaining amount of toner returns to the level before the toner replacement, the contract violation detection unit 11h may regard the toner replacement as being not a contract violation (as being noise), cancel the detection that corresponds to a contract violation, and notify the PC 30 of that the contract violation detection unit 11h has cancelled the detection that corresponds to a contract violation.

The disregard of noise has been described heretofore.

[Supplementary Note]

Toners used in an image forming apparatus for printing are provided by a vendor or a dealer of the image forming apparatus.

The vendor or the dealer of the image forming apparatus typically employs, as a charge system for the license of the image forming apparatus placed at the customer site, a click charge system for charging in accordance with the number of printed sheets.

Therefore, toners for printing are typically provided for free, and are provided to a customer when the customer requests for a toner or a management system detects reduction in a remaining amount of toner of an image forming apparatus via a network.

Typically, it is decided in a contract that a toner being used is replaced with a new toner after a remaining amount of the toner being used is reduced to less than 5%, for example. However, because a request for toner does not affect charging, a customer often replaces a toner at his/her favorite timing (e.g., collectively replaces, when a toner of one color runs out in a color machine, toners of other colors) and requests for a new toner in order to supplement a spare toner.

Therefore, in some cases, toners are provided more than necessary and, as a result, an excessive number of toners may be stocked at the customer site and the toners may be illegally sold.

Because the contract with a customer requires appropriate replacement and provision of toner, it is difficult to make a proper profit under the original contract when toners are excessively provided.

Meanwhile, the management system 1 according to the present disclosure includes the management server 10 connected to a network; the one or more image forming apparatuses 20 connected to the network, each of the one or more image forming apparatuses 20 being managed by the management server 10; and the one or more terminals 30 that access the management server 10, each of the one or more terminals 30 being connected to the network, in which the management server 10 includes a first memory that stores a contract value database, a contract value for each of the one or more image forming apparatuses 20 being stored in the contract value database, the contract value being set in licensing contract regarding each of the one or more image forming apparatuses 20, the contract value being a remaining amount of toner when performing toner replacement, a second memory that stores a first information processing program, a first processor that executes the first information processing program, and a first communication device capable of communicating with the one or more image forming apparatuses 20 and the one or more terminals 30, each of the one or more image forming apparatuses 20 includes a third memory that stores a second information processing program, a second processor that executes the second information processing program, and a second communication device capable of communicating with the management server 10, when the second processor of each of the one or more image forming apparatuses 20 executes the second information processing program, the second processor notifies the management server 10 of information on the remaining amount of toner of the corresponding image forming apparatus 20 via the second communication device, and when the first processor of the management server 10 executes the first information processing program, the first processor acquires the information on the remaining amount of toner from each of the one or more image forming apparatuses 20 via the first communication device, makes a toner remaining amount history by combining the information on the remaining amount of toner with time and date information, the toner remaining amount history being stored in the first memory as a toner remaining amount history database, detects, based on the toner remaining amount history, that the toner replacement has been performed when an increase rate of the remaining amount of toner exceeds a threshold value, and determines, based on the contract value in the contract value database, whether the remaining amount of toner before the toner replacement is not more than the contract value when the toner replacement is detected, and notifies the one or more terminals 30 of that the performed toner replacement corresponds to a contract violation when the remaining amount of toner before the toner replacement is more than the contract value.

Therefore, it is possible to detect whether or not toner replacement by a customer corresponds to a contract violation.

It should be understood by those skilled in the art that various modifications, combinations, sub-combinations and alterations may occur depending on design requirements and other factors insofar as they are within the scope of the appended claims or the equivalents thereof.

What is claimed is:

1. A management system, comprising:
   a management server connected to a network;
   one or more image forming apparatuses connected to the network, each of the one or more image forming apparatuses being managed by the management server; and
   one or more terminals that access the management server, each of the one or more terminals being connected to the network, wherein
   the management server includes
      a first memory that stores a contract value database, a contract value for each of the one or more image forming apparatuses being stored in the contract value database, the contract value being set in licensing contract regarding each of the one or more image forming apparatuses, the contract value being a remaining amount of toner when performing toner replacement,
      a second memory that stores a first information processing program,
      a first processor that executes the first information processing program, and
      a first communication device capable of communicating with the one or more image forming apparatuses and the one or more terminals,
   each of the one or more image forming apparatuses includes
      a third memory that stores a second information processing program,
      a second processor that executes the second information processing program, and
      a second communication device capable of communicating with the management server,
   when the second processor of each of the one or more image forming apparatuses executes the second information processing program, the second processor,
      notifies the management server of information on the remaining amount of toner of the corresponding image forming apparatus via the second communication device, and
   when the first processor of the management server executes the first information processing program, the first processor,
      acquires the information on the remaining amount of toner from each of the one or more image forming apparatuses via the first communication device,
      makes a toner remaining amount history by combining the information on the remaining amount of toner with time and date information, the toner remaining amount history being stored in the first memory as a toner remaining amount history database,
      detects, based on the toner remaining amount history, that the toner replacement has been performed when an increase rate of the remaining amount of toner exceeds a threshold value, and
      determines, based on the contract value in the contract value database, whether the remaining amount of toner before the toner replacement is not more than the contract value when the toner replacement is detected, and notifies the one or more terminals of that the performed toner replacement corresponds to a contract violation when the remaining amount of toner before the toner replacement is more than the contract value.

2. The management system according to claim 1, wherein when the first processor of the management server executes the first information processing program, the first processor,
   creates, based on detection of the toner replacement, a replacement history list, and provides the created replacement history list to the one or more terminals, the replacement history list being a list of times and dates when the toner replacement is performed.

3. The management system according to claim 2, wherein the replacement history list further indicates the remaining amount of toner before the toner replacement.

4. The management system according to claim 1, wherein when the first processor of the management server executes the first information processing program, the first processor,
   predicts, based on the toner remaining amount history, when the one or more image forming apparatuses are out of toner next time, creates a replacement time prediction list, and provides the created replacement time prediction list to the one or more terminals.

5. The management system according to claim 1, wherein when the first processor of the management server executes the first information processing program, the first processor,
   creates, based on the toner remaining amount history, a toner remaining amount graph, and provides the created toner remaining amount graph to the one or more terminals.

6. The management system according to claim 1, wherein when the first processor of the management server executes the first information processing program, the first processor,
   creates a replacement overview and provides the created replacement overview to the one or more terminals, the replacement overview including pieces of information on a present remaining amount of toner for each color, an average remaining amount at the time of the toner replacement for each color, an average replacement period for each color, and the number of days from when the toner replacement is previously performed.

7. The management system according to claim 1, wherein when the first processor of the management server executes the first information processing program, the first processor,
   cancels, when detecting the contract violation and detecting within a particular period that the remaining amount of toner returns to a level before the toner replacement, the detection of the contract violation, and notifies the one or more terminals of that the contract violation detection unit has cancelled the detection of the contract violation.

8. A management method for a management system including a management server connected to a network, one or more image forming apparatuses connected to the network, each of the one or more image forming apparatuses being managed by the management server, and one or more terminals that access the management server, each of the one or more terminals being connected to the network, the management method comprising:

storing, in a first memory of the management server, a contract value database, a contract value for each of the one or more image forming apparatuses being stored in the contract value database, the contract value being set in licensing contract regarding each of the one or more image forming apparatuses, the contract value being a remaining amount of toner when performing toner replacement;

notifying, by each of the one or more image forming apparatuses, the management server of information on the remaining amount of toner of the corresponding image forming apparatus via the second communication device; and by the management server,
  acquiring, the information on the remaining amount of toner from each of the one or more image forming apparatuses via the first communication device;
  making a toner remaining amount history by combining the information on the remaining amount of toner with time and date information, the toner remaining amount history being stored in the first memory as a toner remaining amount history database;

detecting, based on the toner remaining amount history, that toner replacement has been performed when an increase rate of the remaining amount of toner exceeds a threshold value; and determining, based on the contract value in the contract value database, whether the remaining amount of toner before the toner replacement is not more than the contract value when the toner replacement is detected, and notifies the one or more terminals of that the performed toner replacement corresponds to a contract violation when the remaining amount of toner before the toner replacement is more than the contract value.

* * * * *